United States Patent [19]

Niehaus

[11] 3,857,635
[45] Dec. 31, 1974

[54] SYSTEM AND APPARATUS FOR EXPOSING PHOTOSENSITIVE ENGRAVING PLATES

[75] Inventor: William R. Niehaus, Cincinnati, Ohio

[73] Assignee: The E. W. Scripps Company, Cincinnati, Ohio

[22] Filed: Nov. 27, 1973

[21] Appl. No.: 419,410

[52] U.S. Cl.............. 355/132, 96/67, 178/6.7 R, 355/85
[51] Int. Cl. .......................................... G03b 27/02
[58] Field of Search ............. 355/85, 132, 133, 78; 96/67, 68; 178/6.7 R

[56] References Cited
UNITED STATES PATENTS
3,600,172  8/1971  Land.................................. 355/78
3,655,286  4/1972  Thumberger ..................... 355/85

Primary Examiner—Richard L. Moses

[57] ABSTRACT

A system for exposing a photosensitive engraving plate of the type used in newspaper printing to produce an image on the plate corresponding to an image on an image surface and preparatory to etching the plate. The system comprises the steps of providing a generally flat transparent screen formed from a transparent layer of material capable of forming an image therein when concurrently exposed to an electromagnetic field and a light image. This screen includes means for selectively creating the electro-magnetic field. A generally uniform light source is directed onto the flat transparent screen while the electro-magnetic field is created in the screen whereby the layer is cleared of any image therein. Thereafter, the system includes the steps of focusing the image of the image surface onto the cleared flat transparent screen, while the screen is subjected to the electro-magnetic field until the transparent layer duplicates a transparent negative form of the image on the image surface. The transparent screen, having the negative form of the image therein, is then positioned adjacent a generally flat photosensitive engraving plate and a light is directed through the flat transparent screen onto the engraving plate whereby the plate is exposed with the negative form of the image on the image surface. This exposes the standard engraving plate to the image on the image surface for subsequent etching of the plate for use in a printing process.

22 Claims, 6 Drawing Figures

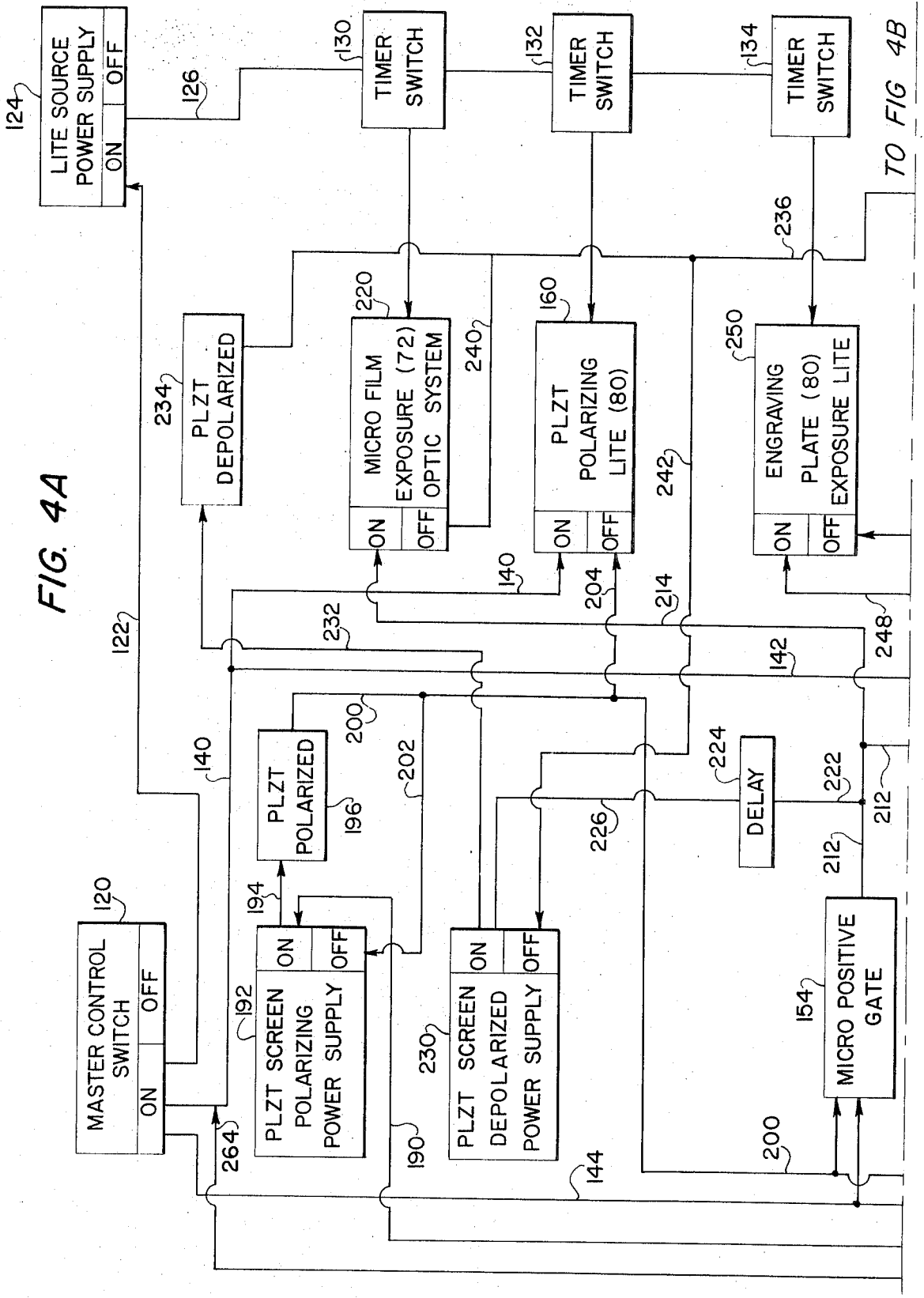

FIG. 4B

SYSTEM AND APPARATUS FOR EXPOSING PHOTOSENSITIVE ENGRAVING PLATES

This invention relates to the art of exposing a photosensitive engraving plate preparatory to etching the plate and using the plate in a standard printing process and more particularly to a system and apparatus for exposing such photosensitive engraving plate.

The invention is particularly applicable for use in transmitting a composed newspaper page or sheet from a central composing room to a series of satellite printing operations to reduce the time and expense of newspaper distribution, and it will be described with particular reference thereto; however, it is appreciated that the invention has much broader applications and may be used in various situations wherein an engraving plate is to be exposed to an image preparatory to etching the plate for a subsequent printing operation.

In newspaper printing, it is now somewhat common practice to set up a composite sheet corresponding to a newspaper page and including both printing and halftone prints of photographs. This sheet is then photographically reproduced, as a negative, which is then placed in contact, or in some instances nearly in contact, with a standard photosensitive engraving plate. This engraving plate generally includes photosensitive coating on a magnesium substrate. Light is then passed through the negative onto the photosensitive coating of the engraving plate to produce certain portions which are mask and other portions which are not. Subsequent etching of the plate by an acid removes metal from the unmasked portion to duplicate in mirror image form the composed sheet. The engraving plate is then overlayed with a stereotype matrix, which is molded under pressure against the engraving plate to produce a flat matrix imprinted with the material on the engraving plate. The material on the stereotype matrix is a positive right reading duplication of the composed sheet. Thereafter, in accordance with standard stereotype practice, the matrix is formed into a drum and used to mold a partially cylindrical stereotype plate which is a wrong reading duplication of the composite sheet for mounting on a rotary printing press. This process of photographing the total sheet is somewhat standard procedure in many newspaper printing plants. Some newspapers still set type for the printed matter of a sheet. This set type is used in conjunction with photosensitive engraving plates for advertisements and photographs to produce the stereotype matrix. However, these newspapers are generally in the process of going to a full engraving plate procedure.

Using either the full engraving plate or a partial engraving plate, each newspaper sheet must be individually composed at the individual newspaper printing plant. To make duplications at various locations, several stereotype matrix sheets may be produced from a single engraving plate and sent to various locations by carrier. This is time consuming and it is not generally done.

To reduce the time and costs experienced in composing sheets at each printing location, it has been suggested that a single newspaper sheet may be composed at a central location or composing room. Thereafter, this composed sheet can be encoded to electrical signals by a scanning process and transmitted by telephone lines, radio channels or microwaves to several separate satellite printing plants. At the satellite location, the composed sheet can then be reconstructed from the transmitted signals. Then, the plates can be made by the standard printing procedure of making a photographic negative to expose a photosensitive plate. In other words, after the sheet has been transmitted by telephone lines, radio channels or microwaves, the reconstructed sheet is subjected to a photographic process to produce a negative which can be placed in contact with a standard photosensitive engraving plate. The further processing would then be substantially the same as now used in most newspaper printing plants. By using this distribution system, newspapers can be printed in several locations from a sheet composed at a central location. This substantially reduces distribution time and man hours in printing identical pages of a newspaper. Undoubtedly this general procedure will be adapted in the future by most companies in the production and distribution of newspapers and other periodicals. At the present time, substantial work is being devoted to improvements in the technology for transmitting photographs, alphanumerical information by line or wave transmission. This work also applies to transmission of total, composed sheets. One of the most promising procedures involves the use of laser scanning at the central location and laser scanning at the receiving locations. This concept is described in U.S. Pat. No. 3,720,784 which is incorporated by reference into this specification. By using this procedure, a full newspaper page can be transmitted from a distant point and recorded on microfilm in approximately two-three minutes at the various satellite locations by using high capacity transmission channels, such as a picture-phone line. For larger band widths, such as microwaves of communication satellites, it is possible to reconstruct the resulting newspaper sheets at even a more rapid rate. The ordinary telephone lines for use in a system as disclosed in the prior patent would anticipate a time of approximately four minutes to transmit a total newspaper page. At the transmitting end of the system, an image from a composed sheet is picked up by a charge couple device. At the receiving end, a laser beam forms an image on a microfilm. As the picture grows it can be monitored on a screen or by other appropriate viewing means. In addition, the viewing end provides an image on a 16 mm transparent flat plastic film. A pulsed laser beam of varying intensity, as disclosed in the prior patent, burns a multitude of holes of different sizes in the film to create a fine pattern of dots with black spaces being left in the pattern to form newspaper headlines and other boldface type. The microfilm need not be developed at the receiving end. This procedure is now being proposed by various newspaper companies and other news dissemination organizations. After the positive reading continuous tone microfilm is produced at the receiving end, it is processed in accordance with standard practice to produce the stereotype plates for use in printing. This involves a substantial amount of time and effort even after the individual sheets have been transmitted by waves or wire to the receiving locations. Indeed, about 10–12 minutes are required to produce the photographic negative. The present invention overcomes this difficulty by providing an improved system for transmitting the image of the microfilm onto the stereotype plates for the press.

The present invention relates to a system used after the microfilm has been formed at the satellite station. This improved system is used to expose the standard photosensitive engraving plate from the continuous image of the microfilm by a process which does not involve the normal photographic process. In accordance with the invention, the system includes the steps of providing a generally flat transparent screen formed from a transparent layer of material capable of forming an image therein when concurrently subjected to an electro-magnetic field and a light image. This screen includes means for selectively creating the electro-magnetic field. A generally uniform light source is directed onto the flat screen while an electro-magnetic field is created in the screen. In this manner, the layer is cleared of any image therein. Thereafter, the system includes the steps of focusing the image from the microfilm onto the cleared flat screen while the screen is subjected to an electro-magnetic field and continuing this focusing step and the electro-magnetic field until the layer of the screen duplicates within the layer a transparent negative form of the image on the microfilm. Thereafter, the flat screen is positioned on a generally flat photosensitive engraving plate of normal construction and a further light is directed through the flat transparent screen onto the engraving plate, whereby the engraving plate is exposed to the negative form of the image which appeared on the microfilm. Of course, the light is then removed from the flat screen and the exposed engraving plate is processed in accordance with standard practice. By using this system, the composed sheet received at a satellite station may be directly transferred to the transparent screen for contact exposure of the photosensitive engraving plate. There is no intermediate process of producing a photographic negative of the microfilm and then using this negative for exposing the plate. Consequently, the time necessary for producing the photographic negative, for developing the negative and handling the same is eliminated by the present invention. In addition, the flat transparent screen of the type anticipated by the present invention can be reused by clearing the image by concurrently using a uniform light source and an electro-magnetic field.

In accordance with the preferred embodiment of the invention, the flat transparent screen is an image storing ceramic plate using the longitudinal electro-optic scattering effect found in coarse-grained (grain size 3) rhombohedral-phase lead-lanthanum-zirconate-titanate (PLZT) ceramics. In plates of these ceramic materials poled normal to the major surfaces, incident light is multiply scattered as it is transmitted, and the intensity of scattered light depends on the ferro-electric remanent polarization state of the plate. This longitudinal electro-optic scattering effect is used in the plate which can be generally defined as a ferroelectric-photoconductor (FE-PC) device that is capable of storing photographic images with reasonably high resolution and good gray scale. The basic flat screen used in practicing the present invention is a conventional four-layer FE-PC structure consisting of a coarse-grained PLZT ferroelectric ceramic layer and a photoconductive film between two transparent electrodes. The preferred embodiment of this structure utilizes a polyvinyl carbazole (PVK) photoconductive film and tin oxide-doped indium oxide ($In_2O_3$) transparent electrodes. Image storage is achieved by spatial variation of the light scattering in the ceramic layer which is accomplished by concurrently subjecting the plate to an image and a voltage across the electrodes. The polarity of the voltage determines the orientation of the domains in the ceramic layer which can produce a positive or negative reproduction of the image.

Other types of ceramic FE-PC device can be used for the flat transparent screen. These devices use either fine-grained lead zirconate titanate or PLZT ferroelectric ceramics as image-storage media. Images are stored as a spatial variation of birefringence which used polarized narrow-spectral-bandwidth light for viewing or projection. In these other devices a preferred orientation of the ferroelectric polarization is established in the plane of the ceramic layer prior to image storage by using either a transverse electric field or a uniform tensile or compressive strain bias.

In summary, the flat transparent screen, in accordance with the preferred embodiment of the invention, includes a PLZT ceramic layer having a thin photoconductive film applied to one surface and sandwiched between two transparent electrodes. To use the electro-optic effect, the ceramic is first exposed to a uniform field of light while, at the same time, a voltage is applied across the photoconductor film and the ceramic layer utilizing the spaced, transparent electrodes. This aligns the photo-electric domains of the ceramic layer in a common direction. When storing an image on the flat screen, the voltage is again applied to the electrodes while the photoconductive film is exposed to the desired image from the microfilm or other image surface. The degree of light falling at various positions on the ceramic layer and photoconductive film combination changes the alignment of the photo-domains in the ceramic layer in proportion to the amount of light falling on the surface while the electrodes are subjected to a voltage. This records or stores the image in the ceramic layer. After exposure to the image and electro-magnetic field has been removed, the image on the ceramic layer can be viewed, either directly, or by projection, by passing light through the ceramic layer. The light is scattered more by the switched domain, with shades of gray being controlled largely by the degree of domain switching within the ceramic layer. When the ceramic is again prepoled by subjecting the ceramic layer to a uniform light source and applying a voltage to the electrodes, the photoelectric domains are again aligned and the image is erased from the ceramic layer and the screen is cleared.

By using a PLZT screen of the type described above, the image of the microfilm, which is generally a positive continuous image, as opposed to a half-tone image, can be converted directly to the photosensitive engraving plate at a relatively low cost and more rapidly. There is no need for the expensive photographic equipment now required in the newspaper production operation. This is a basic improvement in the total process between the set up of a composite sheet to the molding of a stereotype plate to be used in the press. In the past, most attention has been directed toward improvements in the picture transmission from the central location to the satellite stations. By combining the prior improvements in transmitting technology, with the present invention relating to the handling of the transmitted image, a streamlined, efficient distribution of newspaper pages and other material is realized. Of course, the present invention can be used to improve the operation of existing newspaper processes and can be used with various types of systems for transmitting an image in positive form to the printing location. In addition, if the material is transmitted in negative form, the system in accordance with the present invention, can be used to convert the received image from a negative form to a positive form. Then this positive form is converted to a negative form by the invention for contact exposure of a standard photosensitive engraving plate.

The flat transparent screens used in the process, as described above, consist of a PLZT ceramic layer having a thin photo-conductive film applied to one surface and sandwiched between two transparent electrodes. This total structure is transparent and the image is formed in the ceramic layer. When the ceramic layer is exposed to a uniform field of light while at the same time having a voltage applied across the photoconductive film and ceramic layer by the transparent electrodes, the photoelectric domains within the ceramic layer are aligned in a common direction. To store an image in the layer, the voltage applied across the electrodes has the opposite polarity from the clearing or pre-polarizing voltage. When the ceramic layer is exposed to a light passing through a transparency, such as the microfilm, the degree of light falling on the various stages of the ceramic layer and photo-conductive film changes the alignment of the photoelectric domains in proportion to the amount of light falling on the ceramic layer. This image is exposed to the PLZT screen for sufficient time to allow stabilization of the image within the ceramic layer. Thereafter, both the light source having the image and the electric field are removed. When the image in the ceramic layer is viewed, either directly or by a projector, light passing through the ceramic layer is scattered more by the "switched" domains than by the other domains. The shades of gray are controlled largely by the degree of switching for the individual domains. Consequently, the image produced within the layer has a good gray resolution when viewed with light extending through the ceramic. Of course, the image is a continuous tone image which is not acceptable during normal printing operations for photographs. Consequently, when the screen is positioned adjacent the photosensitive engraving plate, a half-tone screen can be interposed at each portion containing a photograph or other information to be half-toned. As an alternative, the transmitted signal may include half-tone treatment of the photographs. After the half-tone screen has been used, it is again prepoled or cleared by flooding the PLZT screen with a uniform light and applying a voltage across the electrodes. By doing this, the photo-electric domains are again aligned and the image is cleared from the screen for subsequent use.

The present invention provides a unique economic system for transmitting newspapers from a composing room to a distant satellite printing plant or plants from which the printed newspaper can be distributed more quickly and more economically. The system now being used requires that the material received by the engraving department of the printing plant be first photographed and the negative developed using normal developing procedures. The engraving plates are then produced by a photo-contact process using the photo-negatives developed from the layout sheets at the printing plant. This process requires not only a great deal of room in the engraving area, but also at least two, sometimes three, operators in the camera set-up and plate making procedures. The prior process also requires a photographic process involving the use of developers, dark rooms and other equipment not required by the present invention. In accordance with the invention, once a newspaper page is set up in a composing room, it may be transmitted by wave or line communications to the satellite station and then reproduced without an intermediate photographic process. Various types of communications lines could be used in practicing the more specific aspects of the present invention.

At the printing plant, the newspaper page can be transferred to a microfilm in accordance with the disclosure in prior U.S. Pat. No. 3,720,784, which is incorporated by reference herein. After the microfilm or other positive has been produced, the system of the present invention, as previously described, allows transfer of a full page from the microfilm to the engraving plate within approximately three-four minutes. The prior method of exposing the pphotosensitive engraving plate to a newspaper page layout involved approximately 10–15 minutes per operation. The present invention relates to the process performed after the microfilm has been received; however, the more specific aspect of the invention includes a total system including transmission of the sheet from a composing room to a satellite station in microfilm form and then using the PLZT ceramic screen for transmitting the microfilm sheet onto a photosensitive engraving plate. By using this invention, a newspaper editorial department could transmit information to a distant satellite printing plant in the form of a complete newspaper edition including both alpha-numeric and pictorial information. This would require approximately 2–3 minutes by using the laser scanning technique in transmitting end and on the receiving end, with the transmission being by a common carrier system such as AT & T long line, picture phone lines, communication satellites, or microfilms. The subsequent transfer of the newspaper from the microfilm to the photosensitive engraving plate would use the PLZT reusable transparent screen. If a negative is received at the receiving end of the transmission, a separate step can be used whereby the negative from the microfilm is transferred to a first PLZT transparent screen and then transferred from this first screen to a second PLZT screen where it will appear in the negative form for exposure of a photosensitive engraving plate.

The primary object of the present invention is the provision of a system and apparatus for exposing a photosensitive engraving plate of the type used in printing, which system and apparatus does not require a photographic step between the image and the contact exposure operation.

Another object of the present invention is the provision of a system and apparatus for exposing a photosensitive engraving plate of the type used in printing, which system and apparatus utilizes a reusable PLZT transparent image storing screen for exposing the engraving plate.

Another object of the present invention is the provision of a system and apparatus as defined above wherein the image is transmitted to the printing plant from a central composing department by wave or line transmission.

Yet another object of the present invention is the provision of a system and apparatus as defined above wherein the image is a complete, composed newspaper sheet.

Another object of the present invention is the provision of a system and apparatus as defined above wherein either a positive or negative microfilm image, including alpha-numerical and/or pictorial information, is transmitted to the printing plant for use in exposing the engraving plate.

Another object of the present invention is the provision of a system and apparatus for exposing a photosensitive engraving plate of the type used in printing, which system and apparatus requires less personnel, less space and less time for the total operation.

Another object of the present invention is the provision of a system and apparatus for exposing a photosensitive engraving plate of the type used in printing, which system and apparatus employs a reusable flat screen as opposed to a photographic process which is not reusable.

Still another object of the present invention is the provision of a system and apparatus as defined above wherein a half-tone screen can be used to create a half-tone of photographs from the composed sheet.

These and other objects and advantages will become apparent from the following description taken together with the accompanying drawings, in which.

Figure 1:
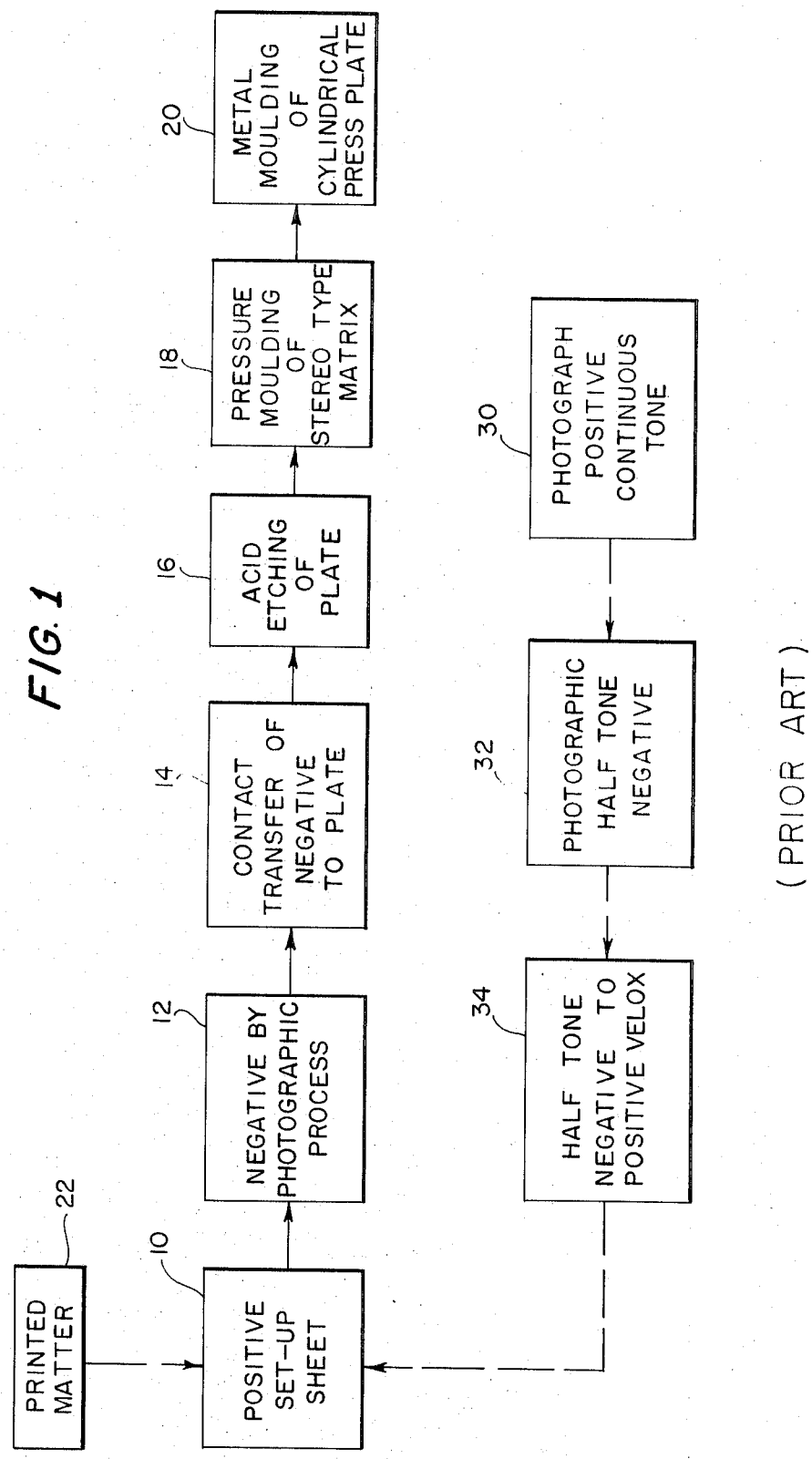
FIG. 1 is a flow diagram illustrating the present procedure for making metal press plates in a newspaper printing plant.

Referring now to FIG. 1, in accordance with somewhat normal practice a positive, continuous line set-up sheet 10 is photographically reproduced as a negative represented by block 12. This negative is placed in contact with a photosensitive engraving plate and transferred to the photosensitive surface of the plate by a light exposure process represented as block 14. Thereafter, the exposed engraving plate is etched by nitric acid as represented by block 16. The etched plate is then pressure molded with a paper composition to form a stereotype matrix represented by block 18 in FIG. 1. Thereafter, the matrix is used to form a metal cylindrical stereotype press plate represented by block 20. The stereotype plate is mounted on a rotary press for printing sheets of a newspaper. FIG. 1 represents common knowledge within the newspaper printing art.

Any printed information, i.e. alpha-numerical information, used in the setup sheet 10 is represented by block 22 and may be set by type or any other procedure. To incorporate photographs into the setup sheet 10, a photographic positive continuous tone represented by block 30 is photographically reproduced in a half-tone negative 32. Thereafter, the half-tone negative is converted by photographic process to a positive Velox for use on setup sheet 10. It is noted that when a half-tone is used, at least two photographic processes are required.

Figure 2:
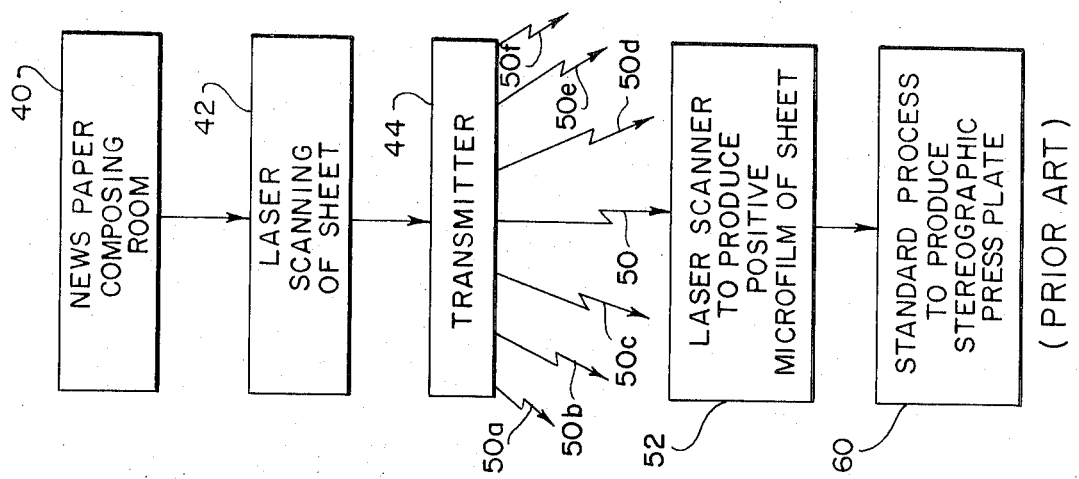
FIG. 2 is a flow chart illustrating the prior art system for utilizing the central composing room and satellite printing operations.

This basic process shown in FIG. 1 is now being proposed for use in a system wherein a composing room 40, as illustrated in FIG. 2, is used to compose the setup sheet 10. This sheet is then scanned by an appropriate encoder, such as a laser scanner represented by block 42. Thereafter, a transmitter 44 transmits the scanned, encoded information on appropriate lines 50, 50a–50f to a plurality of separate satellite printing plants. Each of the lines 50, 50a–50f is directed to a separate satellite printing plant, only one of which is depicted in FIG. 2. At the receiving or satellite plant, the information transmitted on line 50 is decoded by an appropriate mechanism, such as that shown in U.S. Pat. No. 3,720,784, which is incorporated by reference herein. This decoding is represented by block 52 and produces a positive of the newspaper sheet which generally corresponds to sheet 10 of FIG. 1. Thereafter, the steps represented by blocks 12–20 of FIG. 1 are performed on the transmitted sheet to produce a stereotype plate. If photographs were to be transmitted in this system, the receiving station would receive a positive continuous tone as represented by block 30 in FIG. 1. Thereafter, the half-tone negative would be produced before a negative is created at the step indicated by block 12 of FIG. 1. The system shown in FIG. 2 is becoming more attractive due to the ecological and costs factors which require streamlining of the distribution for newspapers in the future. For instance, the predicted energy and fuel shortages, coupled with the economics of delivering newspapers dictates that various new or different systems be developed for distribution of newspapers in the future. The system now proposed and outlined in FIG. 2 is an attempt to meet these developing requirements in the newspaper field. Such a system reduces delivery personnel, miles travelled by delivery trucks, gasoline, and other items required in distributing newspapers. The proposed invention relates to a system which is an improvement in the standard process illustrated schematically as block 60 in FIG. 2. After the newspaper has been composed and transmitted by laser scanner, over common carrier transmission lines, the laser scanner process represented by block 52 produces a microfilm at the various satellite printing plants. The image on the microfilm may be alphanumeric, photographic or combinations thereof.

Figure 3:
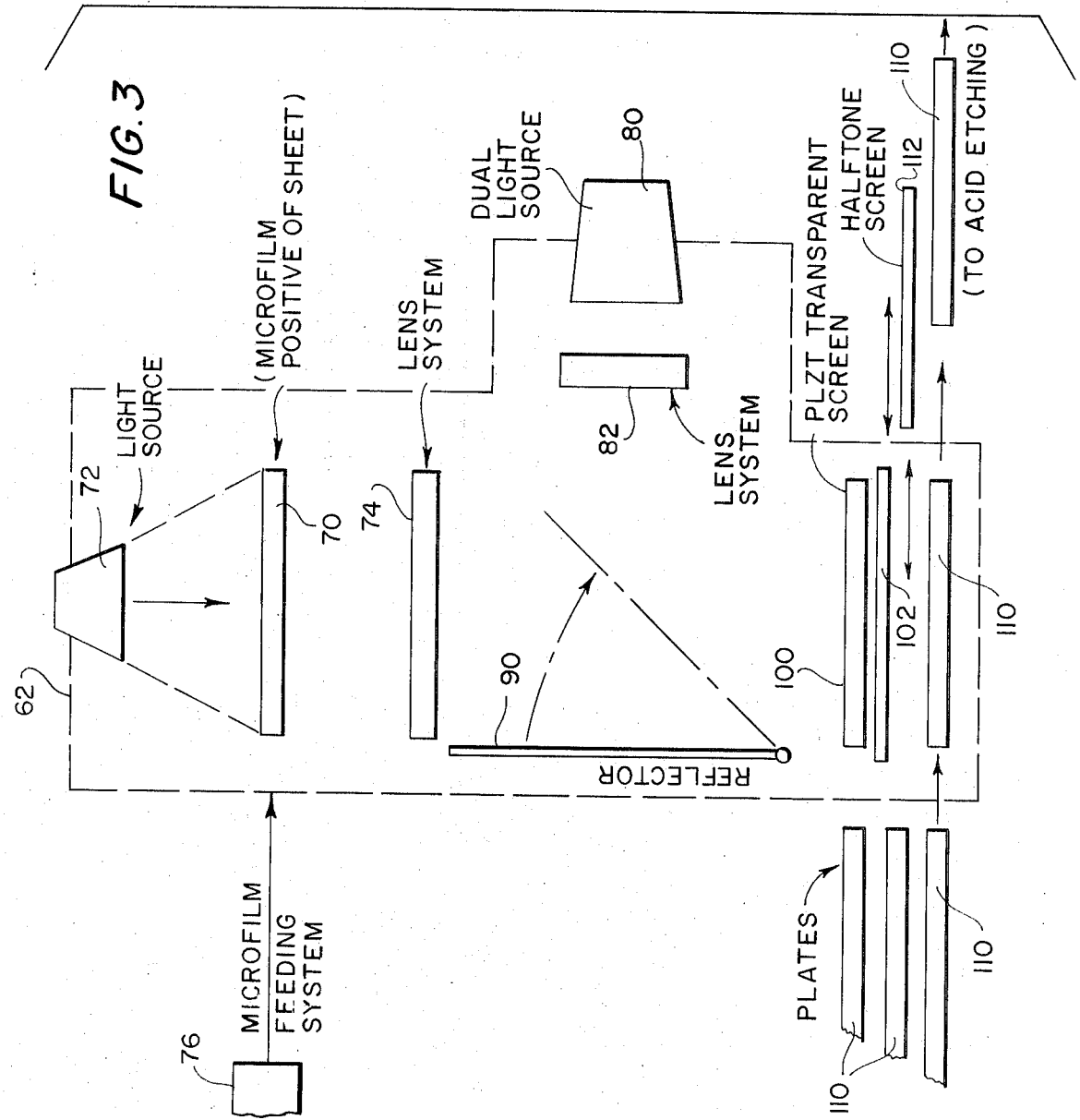
FIG. 3 is a schematic diagram illustrating the preferred embodiment of the present invention; and, FIG. 4 is a schematic wiring diagram and function diagram illustrating the operating characteristics of the preferred embodiment, as shown in FIG. 3. This figure is shown in two parts lettered FIGS. 4A and 4B; however, these figures are to be considered together as shown in FIG. 4C.

Referring now to FIG. 3, the preferred embodiment of the present invention is schematically illustrated as a generally light impervious housing 62 the general boundaries of which are shown as dotted lines. A microfilm 70 is a transparency of the composed sheet received at a satellite station by a decoding system, such as a laser scanner. This transparency includes a continuous line positive of the sheet to be ultimately printed in a rotary printing press. A light source 72 is used for illuminating the image on microfilm 70 so that the image is transmitted through a lens system 74. The microfilm is fed into the housing 62 by an appropriate feed mechanism 76, which may be a roller feed or a platen type feeding arrangement. In the alternative, the transparency or microfilm may be manually placed in the proper position within housing 62. In some instances, it may be possible to replace the microfilm 70 with an opaque screen having an image or an image surface facing downwardly. This image on a surface can be illuminated by an appropriate light source for transmission of the image through the lens 74. However, a microfilm of the type produced by laser scanner is contemplated in the preferred embodiment of the invention. The lens system 74 may enlarge the transparency to the proper size for a sheet of newspaper print if the image on the transparency or other image surface is not as large as contemplated by the total sheet of newspaper print. A dual light source 80 is provided within housing 62. This source can be two separate lights or a single light controlled by two separate mechanisms, as will be explained later in connection with FIG. 4. The output of the dual light source is directed through lens system 82 toward a reflector 90. This reflector has a solid line position which is the inactive position and a dashed line position which is the active position for reflecting the light from source 80 downwardly toward the PLZT flat transparent screen 100. This screen is a PLZT ceramic screen with a PLZT ceramic layer and photosensitive layer sandwiched between two electrodes as previously discussed. The screen will accept an image when a voltage is applied to its electrodes and the image is focused on the ceramic and photosensitive layers. The screen can be cleared by placing a prepolarizing voltage across the electrodes and flooding the surface of the screen by light source 80. Below transparent screen 100 there is provided an opaque shield 102 for shielding a standard engraving plate 110 from the prepolarizing light 80. In the lower portion the standard photosensitive engraving plate 110 is fed from the left into a position below screen 100, as shown in FIG. 3. After the plate has been exposed, it is removed from housing 62 at the right for subsequent acid etching in accordance with normal practice. A half-tone screen 112 may be placed between screen 100 and plate 110 in the areas which include photographs. In this manner, the photographic material can be half-toned during its exposure to plate 110. Of course, other arrangements could be used for providing the half-tone to the various picture areas of the sheet.

In operation, reflector 90 is moved into the dashed line position and one of the light sources within dual light source 80 is activated to flood a light through lens system 82 and against the plate 100. Opaque screen 102 is in the solid line position shown in FIG. 3. With light being flooded onto PLZT transparent screen 100, a pre-polarizing voltage applied across the electrodes of this screen will prepolarize the screen in accordance with normal operation of a PLZT screen system. This clears any image from the screen. Thereafter, reflector 90 is moved into the solid line position, and microfilm feeding system 76 directs the microfilm 70 into the position shown in FIG. 3. This microfilm contains a positive image of the sheet to be reproduced. Light source 72 is then activated which focuses the image within the microfilm through lens system 74 onto the screen 100. At this time, an opposite polarity voltage is applied across the electrodes of PLZT transparent screen 100. After a sufficient time, the image is captured within the ceramic layer of screen 100, forming a negative of the image on microfilm 70. The greater amount of light of a light area in microfilm 70 produces the greatest amount of "switching" of domains within the ceramic layer of screen 100. Consequently, the layer 100 produces a negative of the image of microfilm 70. Thereafter, the light source 72 is turned off and reflector 90 is returned to its dashed line position. Opaque screen 102 is removed from between screen 100 and a plate 110 which is now in position below the screen. Light source 80 then directs light through lens system 82 to the reflector 90. This light is then deflected downwardly toward screen 100 which exposes the standard photosensitive plate 110 to the image in the ceramic layer of screen 100. After sufficient time, the light source is turned off. The plate is then processed to remove the masking formed by the photosensitive operation and is transferred to the etching station or tank. Thereafter, the plate is processed in accordance with the step indicated by blocks 16, 18 and 20 of FIG. 1. A new microfilm 70 is then brought into position by feeding mechanism 76, and the process is repeated by first clearing the image from the ceramic layer of screen 100 and then transferring the image from microfilm 70 to the screen 100. It is seen that screen 100 can be reused. There is no development, no developer, and no man hours required for making a photographic negative of the microfilm image for use in exposing the photosensitive engraving plate 110.

Figure 4B:
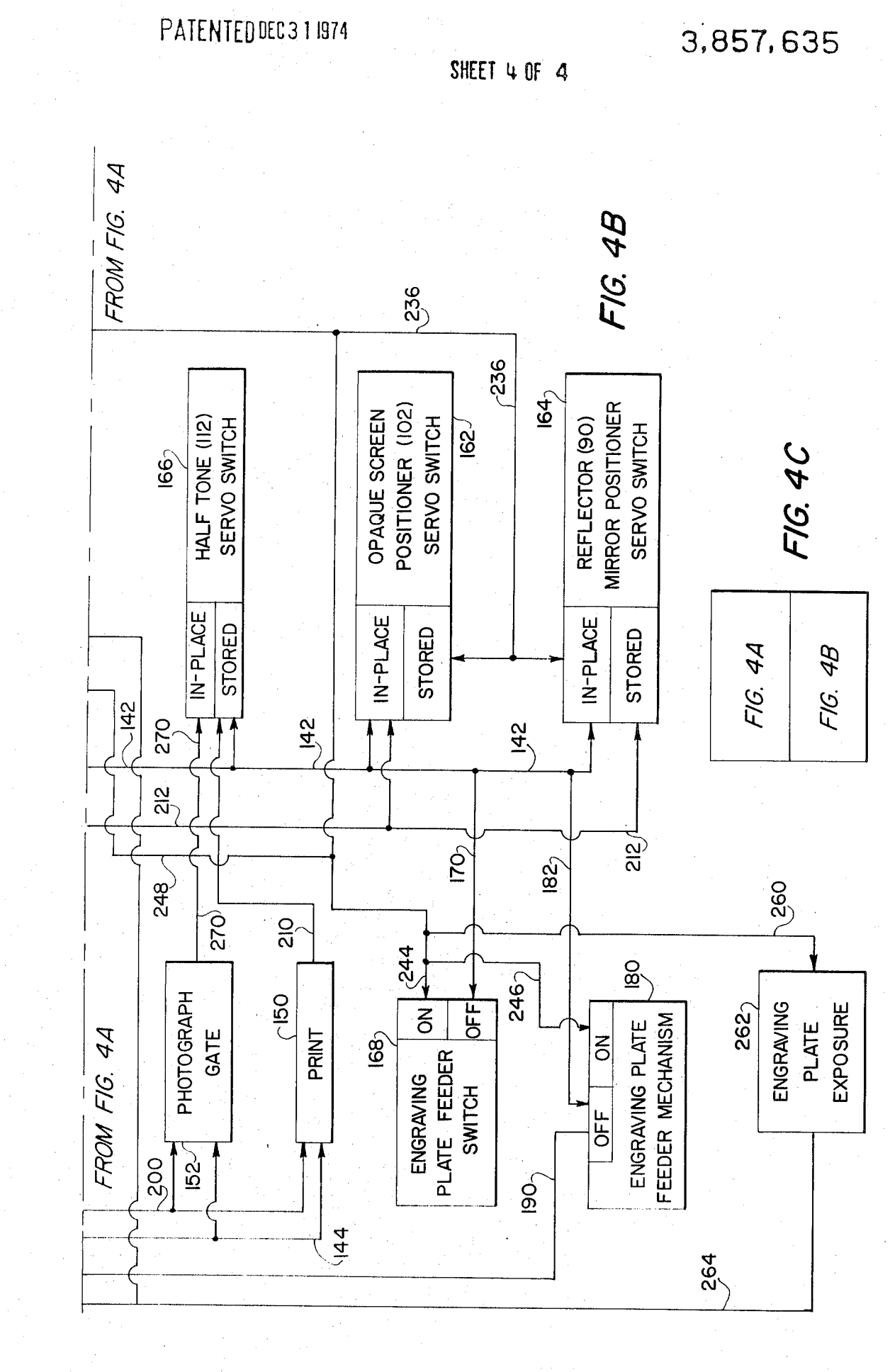

Although a variety of controls, including manual, could be used for practicing the system as explained above for using the schematically illustrated apparatus of FIG. 3, FIG. 4 discloses, schematically, one system for automatically controlling the sequence of operation for the apparatus disclosed in FIG. 3. Referring to this diagram, a master control switch 120 is switched on manually when the system is to be operated. This activates line 122 which applies power to power supply 124 to various lighting systems within the unit. Line 126 activates timers 130, 132, 134 for the purpose of applying this power to the light source. The master switch 120 energizes main starting line 140, 142. In addition, master switch energizes line 144 which enables gates 150, 152 and 154 for a purpose to be explained later. The description of the operation of the diagram shown in FIG. 4 will be made in connection with a situation wherein only printing is contained on microfilm 70. The description will be made in accordance with an operation sequence so that the operation of the diagram is fully appreciated during the description of the several parts. The main starting lines 140, 142 activate control 160 to turn on the PLZT screen polarizing light forming one half of the dual light system 80. At the same time, line 142 activates control 162 to move the opaque screen or shield 102 into its "in place" position, which is the solid line position shown in FIG. 3. At the same time, reflector 90 is positioned by control 164 to place the reflector into its "in place" position which is the dashed line position of FIG. 3. Control 166 is shifted to the "stored" position so that the half-tone screen 112 is moved into the solid line position shown in FIG. 3. Since there is no plate to be fed into the apparatus during the prepolarizing of the PLZT screen 100, control 168 is shifted to the off position by line 170 and the plate feeder 180 is shifted to the off position by line 182. When the feeder mechanism 180 for the plates is in its off condition, line 190 is actuated. This turns on the PLZT screen polarizing or prepolarizing power supply 192. In this condition, light is being directed through lens system 82 against reflector 90. The light is then deflected downwardly onto screen 100. When the internal power supply for the screen is switched on by power supply 192, the screen is polarized or cleared. A time delay represented by block 196 then controls the time during which the polarizing of screen 100 takes place. After the screen has been polarized by light from source 80, line 200 is activated. This actuates line 202 to de-energize power supply 192 of screen 100 and actuate line 204 to turn off the light supply 80 by control 160. Screen 100 has now been polarized and cleared of any image in the ceramic layer of the screen.

Screen 100 is now in the condition for accepting an image as it appears on microfilm 70. Line 200 which has signalled the end of the polarizing process for the screen, also starts the image transfer process. Gates 150, 152, 154 are manually set according to the type of image carried on microfilm 70. In the assumed example, only printing is contained. Consequently, gate 150 is actuated. Since the microfilm carries a positive image, gate 154 is also actuated. Gate 152 is not actuated because the image does not include a photograph. Gate 150 actuates line 210 and gate 154 actuates line 212 upon receiving a signal in line 200. Line 210 is directed to control 166 so that the half-tone screen 112 is not used in the process. Line 212 shifts reflector 90 into its "stored" position, shown in solid line in FIG. 3. At the same time, the opaque screen or shield 102 is shifted to its "in place" position which is also the position shown in FIG. 3. This opaque screen has not yet shifted from this position. Line 212 also actuates line 214 which turns on light 72 by a control shown as block 220. As so far described, light 72 directs the image from microfilm 70 through lens system 74 onto PLZT screen 100 shielded from lower portion of housing 62 by screen 102. Consequently, the image from the microfilm 70 is focused on screen 100. Nothing happens at this stage because a voltage is not applied across the electrodes of screen 100 to cause depolarization and shifting of the electro domains within the ceramic layer of screen 100. Line 222 is actuated by line 212. A time delay unit 224 assures that the components are in the various positions described. Thereafter, line 226 is actuated which switches the pre-polarizing power supply 230 into an on condition for directing a voltage across the electrodes of screen 100. This then causes the image of microfilm 70 to be transferred to the ceramic layer within screen 100. When the power supply 230 is turned on, line 232 is actuated so that a timer 234 for de-polarizing the screen 100 is actuated. After the proper time has expired, line 236 is then actuated by timer 234. The image now is captured within the ceramic layer of screen 100. Line 236 then actuates line 240 to turn off light 72 by control 220 and turn off the power supply 230 by line 242. At this stage, the unit is ready to transfer the image from screen 100 to a standard photosensitive engraving plate 110.

Line 236 signals the completion of the image storing function and starts the plate exposure function. By actuation of this line, reflector 90 is shifted to the "in place" position, which is the dashed line position, and opaque screen 102 is shifted into its "stored" position. Consequently, screen or shield 102 is now shifted from the position shown in FIG. 3 to expose plate 110 to lower portion of housing 62. Line 236 further actuates line 244 which switches the plate feeder switch 168 and the engraving plate feeding mechanism 180 into the on position. This shifts a plate 110 below screen 100. If contact is necessary, the standard engraving plate 110 can be moved upwardly into contact with the lower portion of screen 100, or vice versa. This is all within the knowledge of a person skilled in the art in producing photosensitive engraving plates. Then line 244, in turn, actuates line 248 which turns on the engraving plate exposure light by a control 250. This exposure light is the other portion of dual light source 80, shown in FIG. 3. Line 244 also actuates line 260 which turns on engraving plate timer 262. Consequently, light from source 80 is reflected by reflector 90 through the image screen 100 onto photosensitive plate 110. This progresses until timer 262 indicates that the exposure of the photosensitive plate has been completed. Thereafter, line 264 is actuated. This line is directed to line 140 for continuing the process as described above. After exposure, the plate is processed in accordance with standard procedure by first assuring that the photosensitive surface is fixed with the image from screen 100 and then etching the plate with an appropriate acid, such as nitric acid. Thereafter, the stereotype plate making process continues as in the past.

If a half-tone is required, gate 152 is actuated. Consequently, when line 200 becomes active, a signal appears in line 270. This is directed to control 166 to shift the half-tone into the "in place" position. This produces a half-tone screen between any photograph on the image in screen 100 and the engraving plate to produce a half-tone on the engraving plate. Of course, if there is no printing, gate 150 is not active during the process. This process could be used for producing color by a three or four step process to produce the three or four color plates necessary to provide color reconstitution. This process would be well within the skill of the art in view of the above discussion of the preferred embodiment of the present invention.

The above description relates to a system which can be used for processing a positive image; however, a negative image can be processed in basically the same manner. In addition, an intermediate process could be used to transfer a negative image to a PLZT screen 100 and then use this screen as the positive image, in place of the microfilm 70.

Having thus described my invention, I claim:

1. A process for exposing a photosensitive engraving plate used in printing to an image on an image surface preparatory to etching said plate, said system comprising the steps of:
    a. providing a generally flat transparent screen formed from a transparent layer of material capable of forming an image therein when concurrently exposed to an electro-magnetic field and a light image, said screen including means for selectively creating said electro-magnetic field;
    b. directing a generally uniform light source onto said flat screen;
    c. creating said electro-magnetic field in said screen while said generally uniform light is being so directed whereby said layer is cleared of any image therein;
    d. focusing said image on said image surface onto said cleared flat screen while said screen is subjected to an eletro-magnetic field and continuing said focusing step and said electro-magnetic field until said screen duplicates in said layer a transparent negative form of said image;
    e. positioning a generally flat photosensitive engraving plate adjacent to said flat screen;
    f. directing light through said flat transparent screen onto said engraving plate whereby said plate is exposed to said negative form of said image on said image surface; and,
    g. then removing light from said flat screen.

2. A process as defined in claim 1 including the additional step of:

h. removing said plate from said flat screen.

3. A process as defined in claim 1 wherein said image surface is an image transparency and said focusing step includes transmitting light through said image transparency.

4. A process as defined in claim 1 wherein said image surface is an opaque surface and said focusing step includes directing a light toward said opaque surface.

5. A process as defined in claim 1 wherein said transparent layer is formed from a ceramic material.

6. A process defined in claim 5 wherein said ceramic material is lead lanthanum zirconate titanate material.

7. An apparatus for exposing a photosensitive engraving plate used in printing to an image on an image surface preparatory to etching said plate, said apparatus comprising: a generally flat transparent screen formed from a transparent layer of material capable of forming an image when concurrently exposed to an electro-magnetic field and a light image, said screen including means for selectively creating said electromagnetic field; light means for illuminating said image; a lens system for focusing said illuminated image onto said flat screen; means for activating said field creating means while said image is focused upon said screen whereby said image is produced in negative form in said layer; means for positioning said screen over a photosensitive engraving plate; and means for passing a light through said screen onto said plate whereby said image in said layer is transferred onto said engraving plate.

8. An apparatus as defined in claim 7 including a first light source for illuminating said image and a second light source for passing a light through said screen.

9. An apparatus as defined in claim 8 including a movable reflector having a first position directing said second light source onto said screen and a second position allowing said first light source to reach said screen and means for selectively shifting said reflector between said first and second positions.

10. An apparatus as defined in claim 9 including a light impervious shield and means for selectively moving said shield between a first position between said screen and said plate and a second position remote to said screen and plate.

11. An apparatus as defined in claim 7 wherein said image surface is a transparency and said illuminating means includes means for passing a light through said transparency.

12. An apparatus as defined in claim 7 including a half tone screen and means for selectively moving said half tone screen between a first position between said flat screen and said plate and a second position remote to said flat screen and plate.

13. An apparatus as defined in claim 7 including means for selectively feeding a plate into a position aligned with said screen.

14. An apparatus as defined in claim 7 including a light impervious shield means for selectively moving said shield between a first position between said screen and said plate and a second position remote to said screen and plate.

15. A system defined in claim 7 wherein said transparent layer is formed from a ceramic material.

16. A system as defined in claim 15 wherein said ceramic material is a lead lanthanum zirconate titanate material.

17. A process for producing an exposed engraving plate at several satellite locations, said plates corresponding to an image at a central location, said system comprising the steps of:
   a. encoding said image into a series of transmittable signals at said central location;
   b. transmitting said signals to a plurality of satellite locations;
   c. decoding said signals at each of said satellite locations to produce a duplication of said image at each of said satellite locations;
   d. at each of said satellite stations, providing a generally flat transparent screen formed from a transparent layer of material capable of forming an image therein when concurrently exposed to an electromagnetic field and a light image, said screen including means for selectively creating said electromagnetic field;
   e. directing a generally uniform light source onto said flat screen;
   f. creating said electro-magnetic field in said screen while said generally uniform light is being so directed whereby said layer is cleared of any image therein;
   g. focusing said duplication of said image onto said cleared flat screen while said screen is subjected to an electro-magnetic field; and continuing said focusing step and said electro-magnetic field until said screen duplicates in said layer a transparent negative form of said image;
   h. positioning a generally flat photosensitive engraving plate adjacent to said flat screen;
   i. directing light through said flat transparent screen onto said engraving plate whereby said plate is exposed to said negative form of said duplication of said image; and,
   j. then removing said light from said flat screen.

18. A process as defined in claim 17 including the additional step of:
   k. removing said plate from said flat screen.

19. A process as defined in claim 17 wherein said image surface is an image transparency and said focusing step includes transmitting light through said image transparency.

20. A process as defined in claim 17 wherein said image surface is an opaque surface and said focusing step includes directing a light toward said opaque surface.

21. A process as defined in claim 17 wherein said transparent layer is formed from a ceramic material.

22. A process as defined in claim 21 wherein said ceramic material is a lead lanthanum zirconate titanate material.

* * * * *